United States Patent
Leroy et al.

(10) Patent No.: US 12,048,933 B2
(45) Date of Patent: Jul. 30, 2024

(54) METHOD AND FACILITY FOR CONTINUOUS AERAULIC SEPARATION OF PARTICULATE MATERIALS CONSISTING OF A MIXTURE OF PARTICLES HETEROGENEOUS IN BOTH PARTICLE SIZE AND DENSITY

(71) Applicant: SOCIETE FINANCIERE INDUSTRIELLE, Béthune (FR)

(72) Inventors: Franck Leroy, Sainte Catherine (FR); Jean-François Marechal, Vaudricourt (FR)

(73) Assignee: SOCIETE FINANCIERE INDUSTRIELLE, Béthune (FR)

( * ) Notice: Subject to any disclaimer, the term of this patent is extended or adjusted under 35 U.S.C. 154(b) by 200 days.

(21) Appl. No.: 17/754,780

(22) PCT Filed: Oct. 14, 2020

(86) PCT No.: PCT/FR2020/051821
§ 371 (c)(1),
(2) Date: Apr. 12, 2022

(87) PCT Pub. No.: WO2021/074528
PCT Pub. Date: Apr. 22, 2021

(65) Prior Publication Data
US 2023/0080044 A1 Mar. 16, 2023

(30) Foreign Application Priority Data
Oct. 15, 2019 (FR) ...................................... 1911440

(51) Int. Cl.
*B02C 23/12* (2006.01)
*B02C 23/14* (2006.01)
(Continued)

(52) U.S. Cl.
CPC .............. *B02C 23/12* (2013.01); *B02C 23/14* (2013.01); *B02C 23/22* (2013.01); *B03B 9/061* (2013.01); *B07B 7/083* (2013.01); *B07B 7/086* (2013.01)

(58) Field of Classification Search
CPC ......... B02C 23/12; B02C 23/14; B02C 23/22; B03B 9/061; B07B 7/083; B07B 7/086
See application file for complete search history.

(56) References Cited

U.S. PATENT DOCUMENTS 3,397,845 A * 8/1968 Muller .................... B02C 21/00
241/43
3,490,702 A * 1/1970 Dore ...................... B02C 23/12
241/24.1
(Continued)

FOREIGN PATENT DOCUMENTS

EP 0635308 A1 1/1995

OTHER PUBLICATIONS

International Search Report from PCT/FR2020/051821 dated Feb. 22, 2021, 2 pgs.

*Primary Examiner* — Joseph C Rodriguez
(74) *Attorney, Agent, or Firm* — Tutunjian & Bitetto, P.C.

(57) ABSTRACT

A method for continuous aeraulic separation of particulate materials consisting of a mixture of particles that is heterogeneous in both particle size and density is provided. The method includes grinding particles of materials, generating a gas stream conveying the ground particles, first aeraulic separation on the gas stream in order to separate the particles it contains into a first fraction consisting of the coarsest particles with variable densities and a second fraction consisting of the finest particles. A second aeraulic separation is performed on the first fraction in order to separate the particles that it contains into a third fraction consisting of the coarsest and/or most dense particles and a fourth fraction (Continued)

consisting of the least coarse and/or the least dense particles. A re-injecting of the third fraction or the fourth fraction at the inlet of the grinding is performed while simultaneous recovery of the second fraction as well as the fourth fraction or the third fraction, respectively, as output products.

10 Claims, 4 Drawing Sheets

(51) Int. Cl.
*B02C 23/22* (2006.01)
*B03B 9/06* (2006.01)
*B07B 7/083* (2006.01)
*B07B 7/086* (2006.01)

(56) References Cited

U.S. PATENT DOCUMENTS

| | | | | |
|---|---|---|---|---|
| 3,712,549 | A * | 1/1973 | Cleemann | B02C 17/06 |
| | | | | 241/24.1 |
| 3,982,699 | A * | 9/1976 | Jager | B02C 17/184 |
| | | | | 241/24.1 |
| 4,113,187 | A * | 9/1978 | Hoppen | B02C 21/00 |
| | | | | 241/24.31 |
| 5,377,920 | A | 1/1995 | Alavi et al. | |
| 9,527,112 | B2 * | 12/2016 | Brulefert | B07B 4/06 |
| 2015/0053800 | A1 * | 2/2015 | Bourgeois | B02C 23/32 |
| | | | | 241/49 |
| 2017/0259276 | A1 | 9/2017 | Gabl | |
| 2018/0111131 | A1 | 4/2018 | Filmer et al. | |
| 2023/0035878 | A1 * | 2/2023 | Peys | B03B 9/06 |
| 2023/0080044 | A1 * | 3/2023 | Leroy | B03B 9/061 |
| | | | | 241/80 |

* cited by examiner

METHOD AND FACILITY FOR CONTINUOUS AERAULIC SEPARATION OF PARTICULATE MATERIALS CONSISTING OF A MIXTURE OF PARTICLES HETEROGENEOUS IN BOTH PARTICLE SIZE AND DENSITY

TECHNICAL FIELD OF THE INVENTION

The present invention relates generally to treatments for the grinding and aeraulic separation of particulate materials, and more specifically treatments for separating particulate materials heterogeneous in terms of size, density and shape. It applies to varied fields and particularly to treating ores, waste from construction and public works, plant or animal matter (e.g. biomass, food products), electronic waste, etc.

PRIOR ART

With reference to FIG. 1, treatments for separating heterogeneous particulate materials M with a view to separating constituents of different types from each other generally comprise a $1^{st}$ grinding phase composed of a grinder B combined with a classification CL1 by sizes intended to separate the particles into the coarsest particles and into the finest particles until a certain particle size range is attained, and a $2^{nd}$ classification phase CL2 following the $1^{st}$ grinding phase intended to separate the finest particles and/or the particles having different properties (typically a densimetric classification to separate the densest particles from the least dense particles). In certain applications, the densest particles are metals that it is sought to recover from waste.

In such a known approach, the coarsest particles from the first separation step are reinjected at the grinder inlet to be subdivided again.

The noteworthy drawback of this approach is the successive aspect of CL2 which only comes into effect after the combined action of B and CL1 has been finalised. This may result in some cases in a reduction in the efficiency of the classification CL2 as well as requiring a high energy consumption for the action B combined with CL1 which must treat the entirety of the materials.

DESCRIPTION OF THE INVENTION

The present invention aims to remedy these drawbacks with a totally innovative approach.

The present invention aims to improve existing methods for separating heterogeneous materials and to make it possible, through the novel simultaneous combination of grinding with the 2 aeraulic classifications, to generate a fraction containing particles classified both in terms of particle size and density and another fraction also classified in terms of particle size and density (for example, one fraction with finer and denser particles and a second fraction with coarser and less dense particles).

For this purpose, according to a first aspect, the present invention relates to a method for continuous aeraulic separation of particulate materials consisting of a mixture of particles that is heterogeneous in both particle size and density, characterised in that it comprises the following steps
 (a) grinding particles of materials,
 (b) generating a gas stream conveying the ground particles,
 (c) first aeraulic separation on said gas stream in a first aeraulic separation unit in order to separate the particles it contains into a first fraction consisting of the coarsest particles with variable densities, and a second fraction consisting of the finest particles,
 (d) second aeraulic separation on said first fraction in a second aeraulic separation unit in order to separate the particles it contains into a third fraction consisting of the coarsest and/or densest particles and a fourth fraction consisting of the least coarse and/or the least dense particles,
 (e) reinjecting the third fraction or the fourth fraction at the inlet of the grinding, and
 (f) simultaneous recovery of the second fraction as well as the fourth fraction or the third fraction, respectively, as output products.

The invention is implemented according to the embodiments and alternative embodiments disclosed hereinafter, which are to be considered individually or according to any technically feasible combination.

Advantageously, the first aeraulic separation comprises a dynamic classification associated with a recovery of particles.

According to a preferred embodiment, the first fraction is recovered out of the gas stream and is conveyed mechanically to a gas stream feeding the second aeraulic separation unit.

Similarly, the second aeraulic separation comprises a dynamic classification associated with a recovery of particles.

According to a specific aspect of the present invention, the third or the fourth fraction is recovered out of the gas stream and is conveyed mechanically or via the gas stream to the inlet of the grinding step.

More specifically, when this method is applied to the separation of particulate materials containing metallic materials and non-metallic materials that are lighter than metallic materials, step (e) comprises reinjecting the third fraction of the inlet of the grinding to recover a second fraction comprising particles of the finest particle size with an increased proportion of metallic materials relative to the initial particles, and a fourth fraction comprising particles of the coarsest and least dense particle size with an increased proportion of non-metallic materials relative to the initial particles.

The present invention also relates to an installation for the continuous aeraulic separation of particulate materials consisting of a mixture of particles heterogeneous both in terms of particle size and density, characterised in that it comprises:
 a grinder fed with a heterogeneous mixture of particles to be treated,
 a means for generating at the outlet of the grinder a gas stream containing the particles from the grinding,
 a first aeraulic classifier receiving said gas stream and capable of generating a first fraction containing the coarsest particles with variable densities and a second fraction containing the finest particles,
 a second aeraulic classifier receiving said first fraction and capable of generating a third fraction containing the coarsest and/or densest particles and a fourth fraction containing the least coarse and/or least dense particles, and
 means for conveying the third fraction or the fourth fraction towards the inlet of the grinder.

Preferably, the first aeraulic classifier comprises a dynamic classifier associated with a particle recuperator.

Advantageously, the installation further comprises a pipe for reinjecting the clean air stream at the recuperator outlet at the inlet of the grinder.

More specifically, further comprises a means for mechanically conveying the particles of the first fraction to a diffuser inserted on an inlet pipe of the second aeraulic classifier.

According to a specific embodiment, the second aeraulic classifier comprises a second dynamic classifier associated with a second particle recuperator.

According to a specific aspect, the installation further comprises a pipe for reinjecting the clear air stream at the outlet of the second particle recuperator at the inlet of the second dynamic classifier, or optionally at the inlet of the grinder if the fourth fraction returns thereto.

Moreover, additionally, the installation further comprises a means for mechanically or aeraulically conveying particles from the third or the fourth fraction to the inlet of the grinder.

BRIEF DESCRIPTION OF THE FIGURES

Further advantages, aims and features of the present invention emerge from the following description referring, for the purposes of explanation and not limitation, to the appended drawings, wherein.

DESCRIPTION OF EMBODIMENTS

It will be noted in the introduction that the terms "coarse", "fine", "dense", "low-density", etc., alone or associated with comparative or relative terms, are to be looked at in the eyes of a person skilled in the art, i.e. as characteristic, median or mean values, of a given particulate composition, covering ranges which in reality can overlap.

Figure 1:
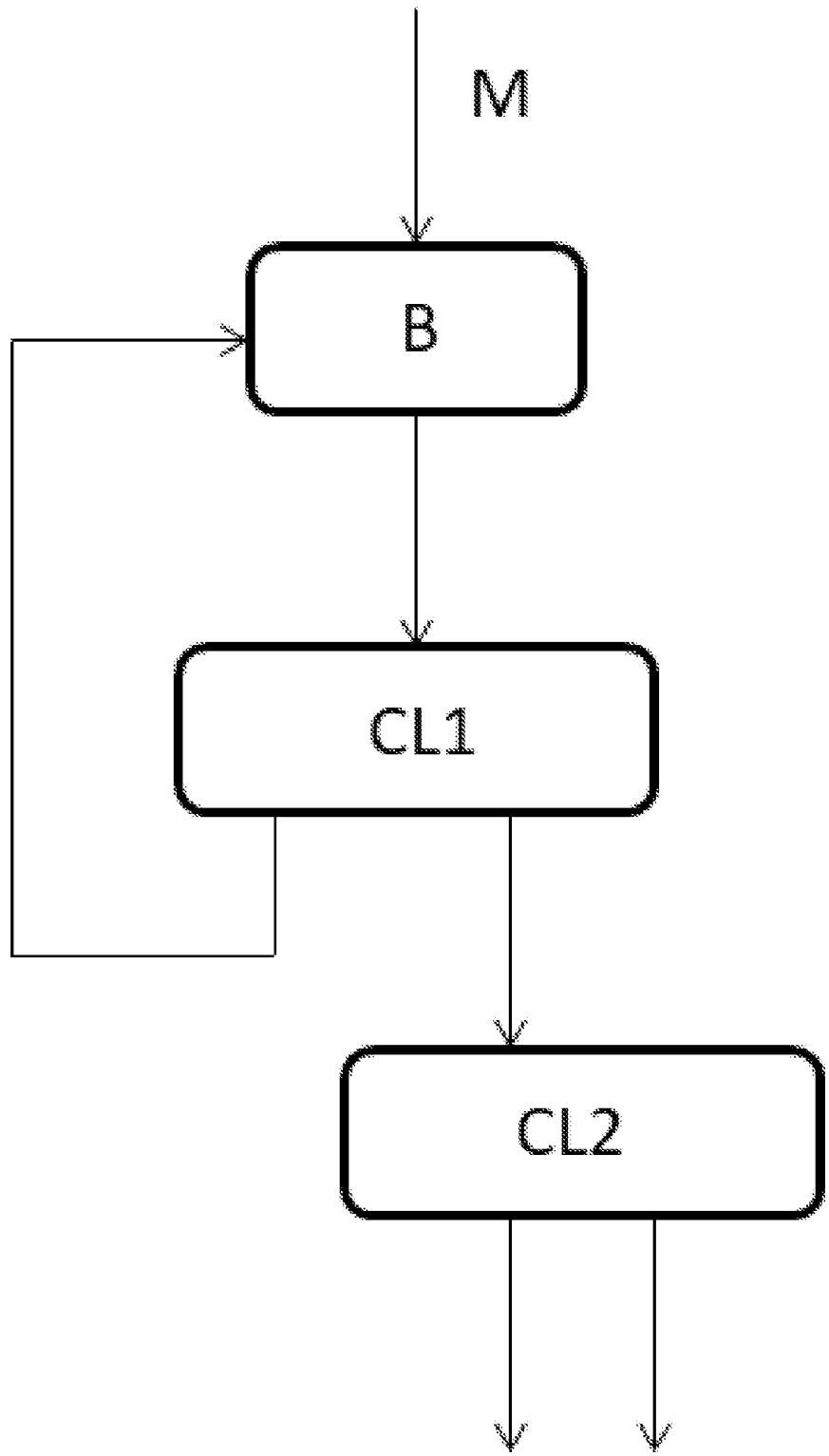
FIG. 1, already described in the introduction, is a general diagram of a method for separating heterogeneous particulate matter according to the prior art (classified grinding phase, followed by a $2^{nd}$ classification phase)
Figure 2:
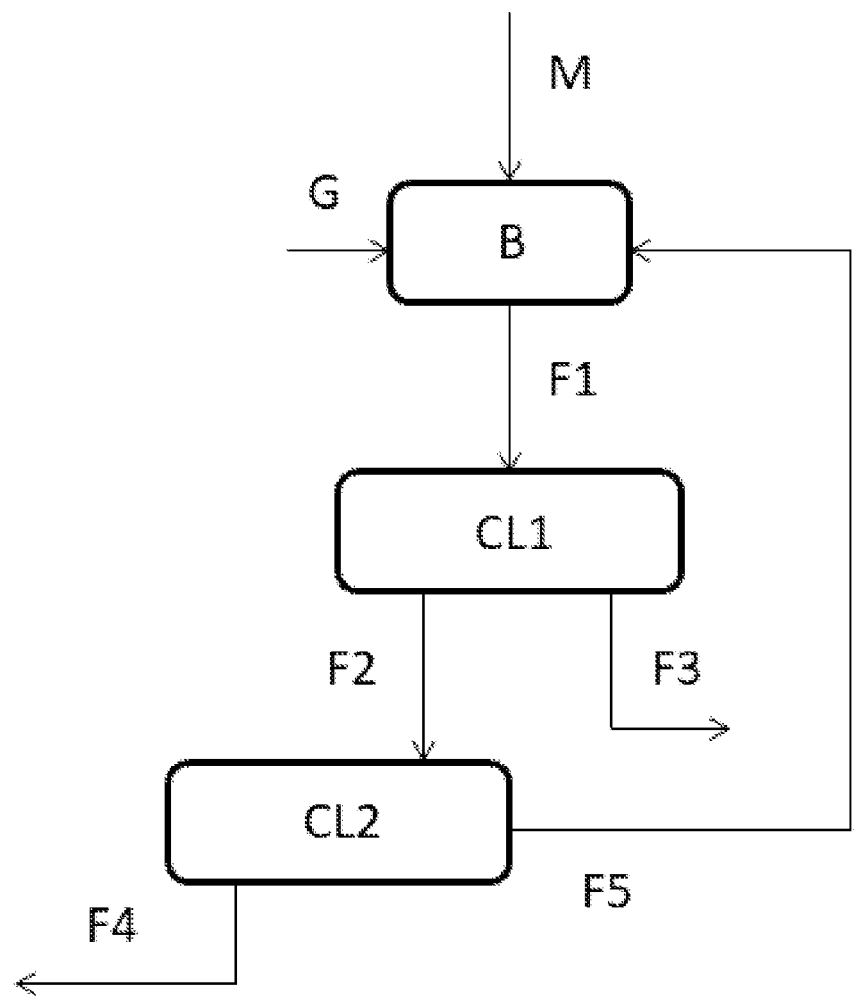
FIG. 2 is a first general diagram of a method for separating heterogeneous particulate matter according to the present invention, in the case where a third fraction returns to the grinder.
Figure 3:
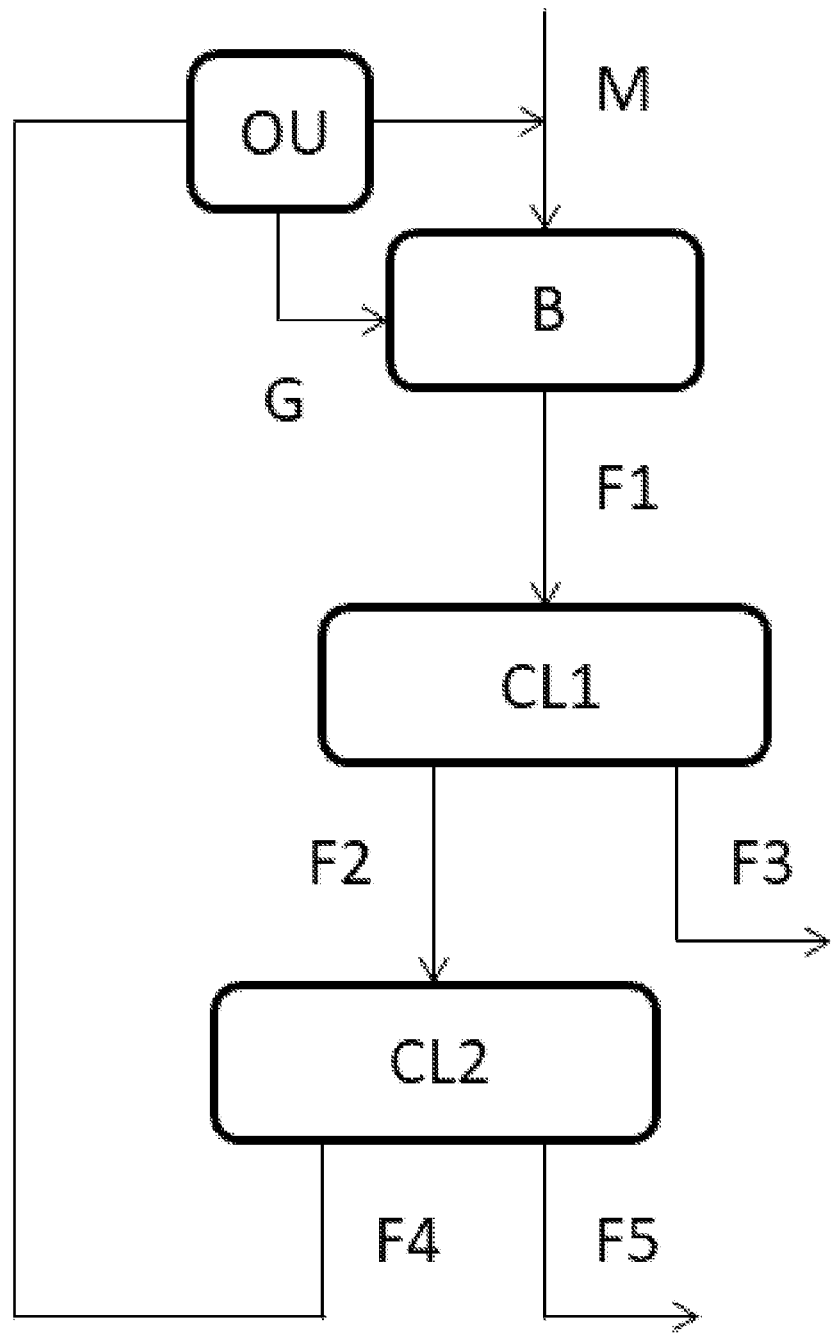
FIG. 3 is a variant of FIG. 2, in the case where the fourth fraction returns to the grinder.

With reference firstly to FIGS. 2 and 3, a method for separating particulate materials according to the invention will be described.

In a manner common to both figures, the starting material M, optionally pre-fractionated by means known per se, is introduced into a grinder B also receiving a gas stream G (typically air or another gas) so as to generate an aeraulic stream F1 containing particles in a relatively wide particle size range, with a maximum size for example less than 500 pm.

This stream F1 is applied to the inlet of a first classification unit CL1 intended to separate the particles into a stream F2 of the coarsest particles and a stream F3 of the finest particles.

Unlike the method according to the prior art where the stream F2 of the coarsest particles is redirected directly to the inlet of the grinder, this stream is here subjected simultaneously to a second classification (particle size and/or densimetric) at a second classifier CL2 which generates a fourth stream F4 of the least coarse and/or least dense and a third stream F5 of the coarsest and/or densest particles.

At this level, the method can have two alternative implementations, depending on the type of product to be treated and the target application.

Thus, in a first implementation illustrated in FIG. 2, the coarsest and/or densest particles (stream F5) are redirected towards the inlet of the grinder B, while the stream F4 of the least coarse and/or least dense particles is recovered as a finished or intermediate product.

In a second implementation illustrated in FIG. 3, the least coarse and/or least dense particles (stream F4) are redirected towards the inlet of the grinder B, while the stream F5 of the coarsest and/or densest particles is recovered as a finished or intermediate product.

In parallel, the stream F3 of the finest particles is recovered to form another finished or intermediate product.

The implementation of FIG. 2 is applicable for example for recovering metallic products in a starting material consisting of waste (electronic waste, waste from manufacturing industry in general, construction and public works, etc.). Thus, by feeding the grinder continuously with the starting material, and extracting rapidly, because simultaneously, from the streams treated, the lightest particles (here the non-metallic materials: polymers, various minerals, etc.) still in the coarse state thereof, a particularly cost-effective method is obtained for obtaining at the stream F3 particles that are both fine and substantially more concentrated in metals (denser) than the starting material.

This stream F3 thus forms the finished or intermediate product essentially sought.

The stream F4, consisting depending on the case of minerals, polymers, etc., also forms another finished or intermediate product from the treatment, which can be reused appropriately according to the nature thereof and the target application, and for example supply the recycling industry.

The implementation of FIG. 3 is applicable particularly in the case where the fraction sought most from the initial product is the least dense fraction (cases for example of fruit husks to be recovered as fuels). In this case, the rapid extraction of the coarsest and densest fraction F5 (here fruit husks, which can be for example palletised to form a fuel) makes it possible to recover particularly efficiently at the stream F3 an intermediate or finished product of fine particle size and low density (here the inner part of the fruit converted into powder for food application for example).

Figure 4:
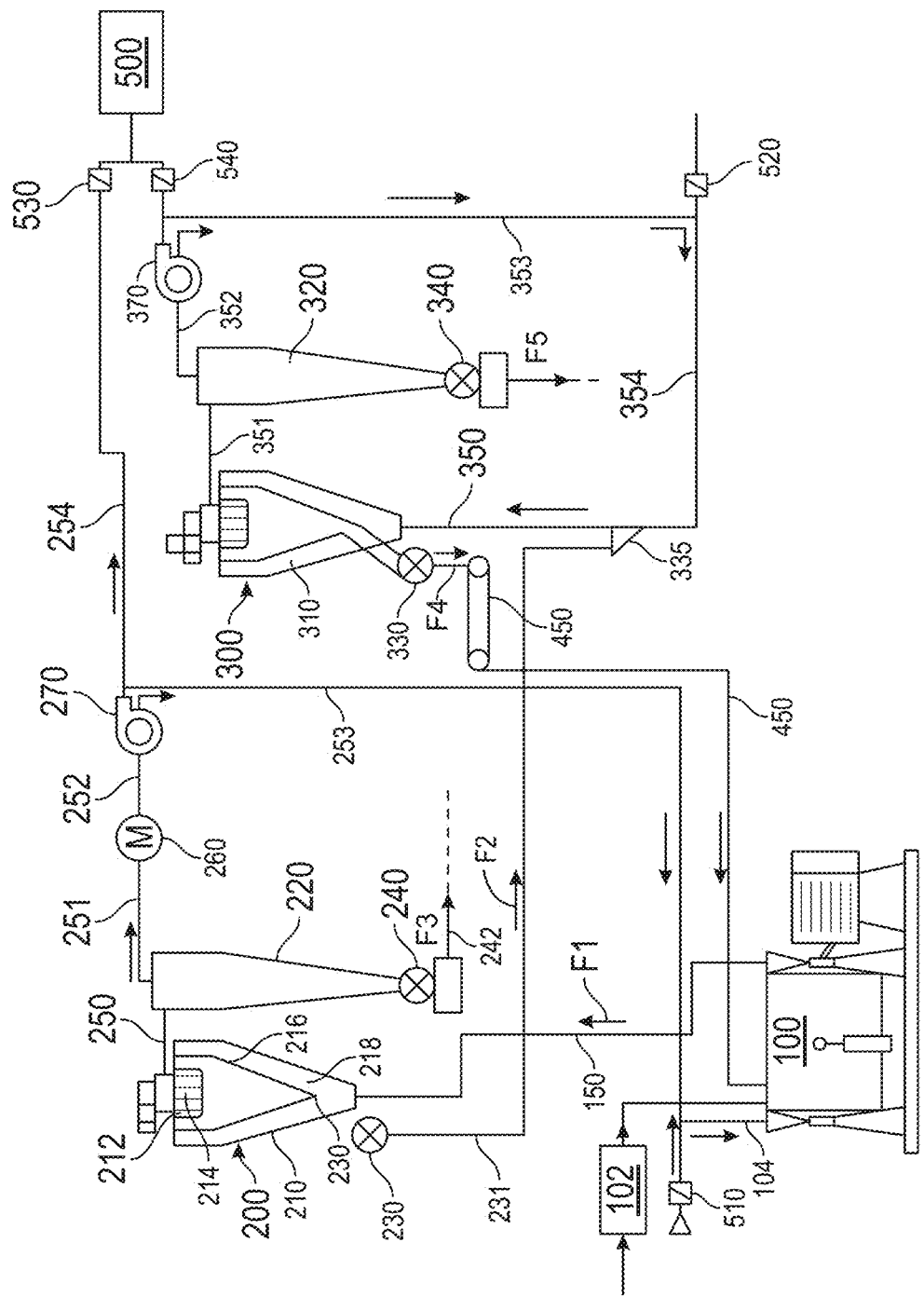
FIG. 4 illustrates an example of an installation for implementing the method in FIG. 2.

With reference now to FIG. 4, an example of an installation intended to recover from waste containing, on one hand, metals and, on the other, non-metals less dense than the metals, on one hand, an essentially metallic fraction with a fine particle size, and, on the other, an essentially non-metallic fraction with a coarser and less dense particle size will be described.

This installation firstly comprises a grinder 100 (grinder B in FIG. 2) receiving at the inlet (for example a pneumatic conveyor, not illustrated) particulate materials 102, for example electronic waste pre-ground in an initial step not illustrated, in a particle size for example between 0 and 10 mm.

The grinder also receives, via a pipe 104, a clean or low-dust gas stream (generally air) intended to convey the particles at the outlet of the grinder 100.

This grinder can be produced according to any known technology and one of the known grinding methods (compression, impact, attrition, depending on the nature and size of the starting material to be ground and the sought fineness) and designed to reduce the initial fragments into a powder with a particle size typically less than about 500 pm. As a general rule, this maximum particle size is selected to ensure effective physical separation between the metallic particles and the non-metallic particles in the particulate material, avoiding as much as possible the presence of grains containing both metallic materials and non-metallic materials.

The particles at the outlet of the grinder via the gas stream passing through the grinder, into a pipe 150 (stream F1), to a first aeraulic separation station 200, this station here comprising a dynamic turbine classifier 210, of a type known per se, associated with one or more recuperators 220 of the particles contained in the air, for example such as cyclones, bag filters, pocket filters, all known per se.

The classifier 210 schematically comprises a rotor 212 including blades 214 rotating at an adjusted speed above a collection hopper 216.

The air stream F1 conveying the particles is conveyed via the base of the apparatus through a peripheral space 218 in the form of a frusto-conical ring located between the outer wall of the separator and the hopper 216. The particles are subjected at the blades 214 of the rotor to a combined effect of centrifugation, aeraulic entrainment and gravitational drop, such that ultimately the finest particles pass through the rotor and emerge in the air stream into an upper outlet pipe 250 of the separator, and that the coarsest particles are kept outside the rotor and accumulate at the bottom of the hopper, from where they are extracted for example via an alveolar lock 230.

This separator, with a powder containing metals and non-metals, makes it possible to carry out a first recovery, in the outflowing air stream in the top part, of fines having a proportion of metallic particles substantially greater than in the initial ground product, with consequently a lower proportion of non-metallic particles, while the coarsest particles are recovered at the bottom of the separator 210 and extracted via the alveolar lock 230 to simultaneously undergo a second classification as will be seen hereinafter (stream F2)

The pipe 250 is connected to the inlet of the particle recuperator 220, for example one or more cyclones, bag filters or pocket filters, the parameters of which are adjusted to remove from the air stream most of the fines suspended therein. As stated, these particles are fine particles with an increased proportion of metals, and form a first product from the treatment. These particles are recovered via an alveolar lock 240 to form a finished product or to be directed (arrow 242) towards another treatment (stream F3).

The air stream at the outlet of the particle recuperator 220 flows in a pipe 251 towards a heat exchanger 260 then towards an extraction fan 270 which generates the air stream in the grinder and in the separation station 200. This air stream, which can remain very slightly charged with particles, is reinjected at the inlet of the grinder 100 via a pipe 253. It will be noted there that the heat exchanger 260 makes it possible to cool the air before the return thereof towards to the inlet of the grinder, particularly when the latter generates due to the operating principle thereof a significant rise in the temperature of the air stream and the particles conveyed (grinding heat).

The dynamic turbine classifier 210 is advantageously of the type having an adjustable separation threshold, and for example selected so as to allow at the inlet a particle size of up to 5 mm, with an adjustable particle size separation threshold between 3 and 400 pm.

This first separation station 200 is functionally connected to a second separation station 300 also consisting here of a dynamic turbine classifier 310 of a type known per se, combined with one or more other particle recuperators 320, preferably of the same type as the recuperator(s) 220.

More specifically, the fraction F2 from the alveolar lock 230 associated with the classifier 210, consisting of the coarsest metallic and non-metallic particles, is conveyed by a gravitational or mechanical conveyor (line 231) and injected via a diffuser 335 into an air stream conveyed into a pipe 350, which feeds the base of the classifier 310. This classifier 310 advantageously has the same structure as that of the classifier 210; this structure will not be described again, it being recalled that such classifiers are known per se. This classifier is configured such that the coarsest and/or densest particles are kept outside the turbine and accumulate at the bottom of the hopper. They are collected by an alveolar lock 330 and reinjected via a gravitational or mechanical conveyance line 450 at the inlet of the grinder 100 (stream F4).

The least coarse and/or least dense particles emerge in the air stream in the top part of the classifier 310. This stream is conveyed via a pipe 351 to the particle recuperator 320 which extracts the particles therefrom, here forming a second product from the treatment obtained by the installation, i.e. a relatively coarse and low-density powder with an increased proportion of non-metals. The latter accumulate at the bottom part and are extracted via an alveolar lock 340 to be conveyed and for example packaged for recycling (stream F5). The top part of the recuperator 320 is connected by a pipe 352 to an extraction fan 370 which generates the air stream through the station 300, and the outlet of this fan is connected via pipes 353, 354 to the diffuser 335 cited above.

Dampers 510, 520, 530, 540 can be controlled respectively:
- to enable the fresh air supply to the grinder via the pipe 104,
- to enable the air supply to the diffuser 335 via the pipe 354,
- to enable the evacuation of the aeraulic excess from the fan 270, via a filtering station 500 removing the last particles (of a type known per se), to the atmosphere,
- to enable in the same way the evacuation of the aeraulic excess from the fan 370 to the atmosphere via the filtering station 500.

Thus the installation in FIG. 4, by the specific combination of a grinding and simultaneously of a double stage of classifications, makes it possible, without using separate particle size classification and densimetric classification steps, to obtain particularly effectively and economically, on one hand, a fraction (F3) containing the finest particles with a substantially increased proportion of metals, and, on the other, a fraction (F4) containing the relatively coarse and low-density particles with a substantially increased proportion of non-metals. It should be understood that the detailed description of the subject matter of the invention, given merely by way of illustration, in no way constitutes a limitation, the technical equivalents also being included in the scope of the present invention.

The invention claimed is:

1. A method for continuous aeraulic separation of particulate materials consisting of a mixture of particles that is heterogeneous in both particle size and density, the method comprising:
   (a) grinding initial particles of materials,
   (b) generating a gas stream conveying the ground particles,
   (c) first aeraulic separation on said gas stream in a first aeraulic separation unit in order to separate the particles contained in the first aeraulic separation unit into a first fraction consisting of coarsest particles with variable densities, and a second fraction consisting of finest particles, (d) second aeraulic separation on said first fraction in a second aeraulic separation unit in order to separate the particles contained in the second aeraulic unit into a third fraction consisting of coarsest and/or densest particles and a fourth fraction consisting of least coarse and/or least dense particles, (e) reinjecting the third fraction to an inlet of the grinding to recover the second fraction comprising particles of the finest particle size with an increased proportion of metallic materials relative to the initial particles, and reinjecting the fourth fraction comprising particles of the coarsest and least dense particle size with an increased proportion of non-metallic materials relative to the initial particles, and (f) simultaneous recovery of the second fraction as well as the fourth fraction or the third fraction, respectively, as output products.

2. The method according to claim 1, wherein the first aeraulic separation comprises a dynamic classification associated with a recovery of particles.

3. The method according to claim 1, wherein the first fraction is recovered out of the gas stream and is conveyed mechanically to a gas stream feeding the second aeraulic separation unit.

4. The method according to claim 1, wherein the second aeraulic separation comprises a dynamic classification associated with a recovery of particles.

5. The method according to claim 1, wherein the third or the fourth fraction is recovered out of the gas stream and is conveyed mechanically or via the gas stream to the inlet of the grinding step.

6. An installation for the continuous aeraulic separation of particulate materials consisting of a mixture of particles heterogeneous both in terms of particle size and density, the installation comprising:

a grinder fed with a heterogeneous mixture of particles to be treated, a means for generating at the outlet of the grinder a gas stream containing the particles from the grinding, a first aeraulic classifier comprising a first dynamic classifier associated with a particle recuperator for receiving said gas stream and capable of generating a first fraction containing coarsest particles with variable densities and a second fraction containing finest particles, a pipe connected to an outlet of the particle recuperator and configured to reinject a clean air stream at an inlet of the grinder;

a second aeraulic classifier receiving said first fraction and capable of generating a third fraction containing the coarsest and/or densest particles and a fourth fraction containing the least coarse and/or least dense particles, and means for conveying the third fraction or the fourth fraction towards the inlet of the grinder.

7. The installation according to claim 6, further comprising a means for mechanically conveying the particles of the first fraction to a diffuser inserted on an inlet pipe of the second aeraulic classifier.

8. The installation according to one of claim 6 wherein the second aeraulic classifier comprises a second dynamic classifier associated with a second particle recuperator.

9. The installation according to claim 8, further comprising a pipe for reinjecting the clear air stream at the outlet of the second particle recuperator at the inlet of the second dynamic classifier, or optionally at the inlet of the grinder in the case where the fourth fraction returns thereto.

10. The installation according to claim 8, further comprising a means for mechanically or aeraulically conveying particles from the third or the fourth fraction to the inlet of the grinder.

* * * * *